Nov. 29, 1938.   J. W. GALYON   2,138,630
TABULATING MACHINE
Filed Dec. 27, 1933   4 Sheets—Sheet 2

INVENTOR
John W. Galyon
BY
A. C. Maby
ATTORNEY

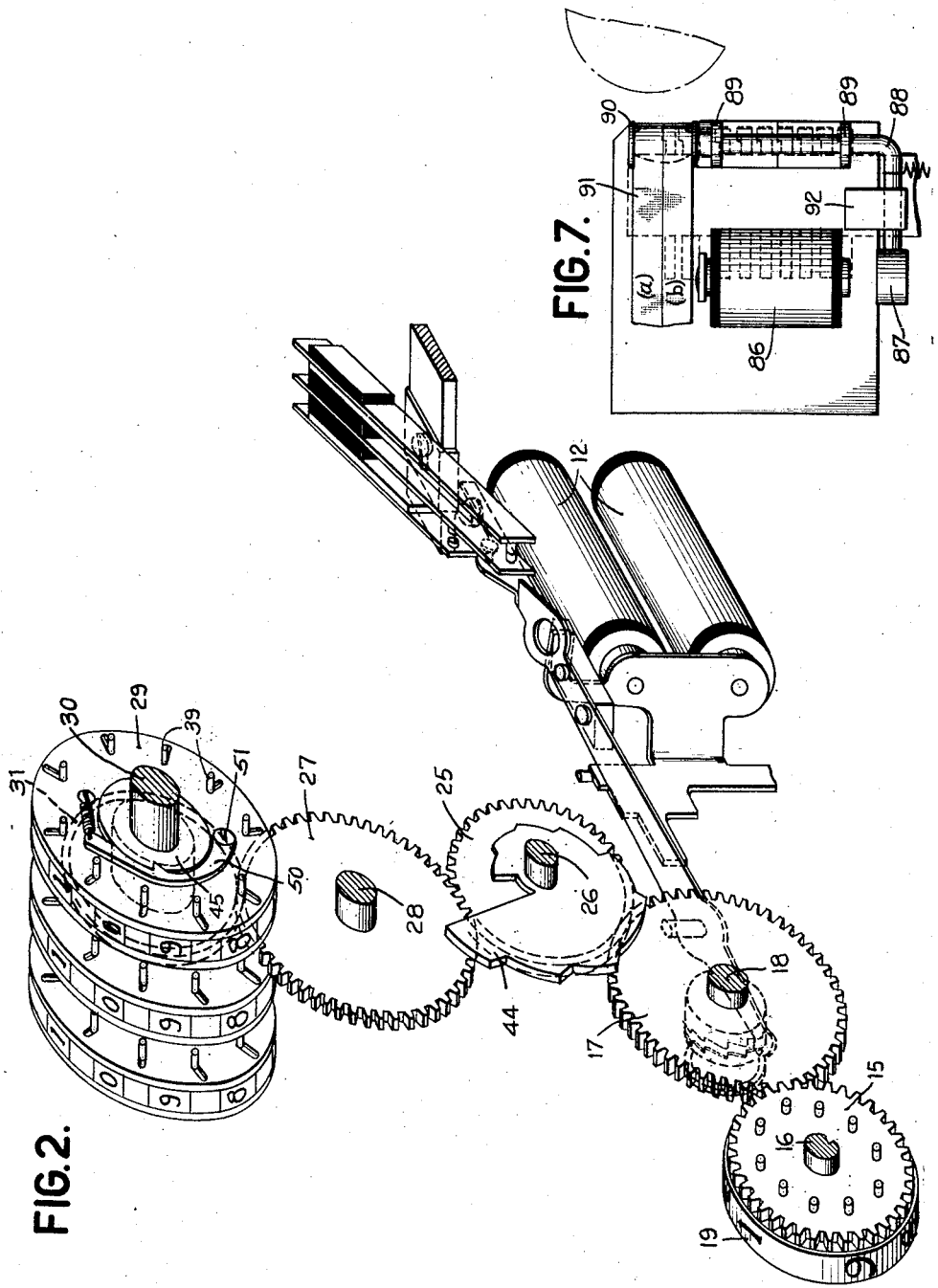

Nov. 29, 1938.    J. W. GALYON    2,138,630
TABULATING MACHINE
Filed Dec. 27, 1933    4 Sheets-Sheet 4
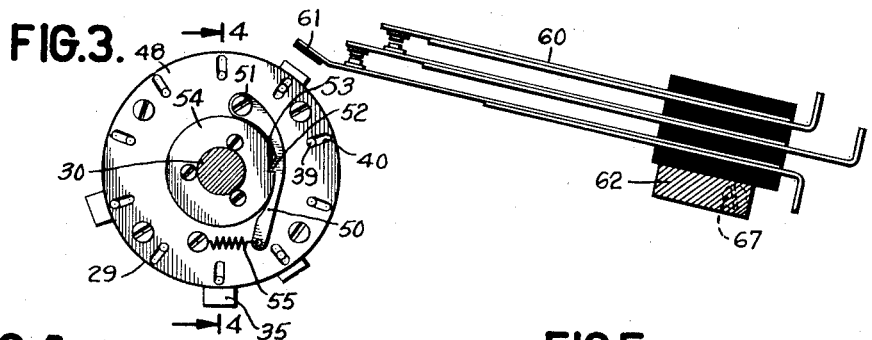
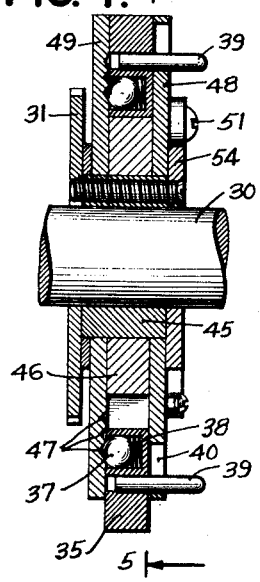
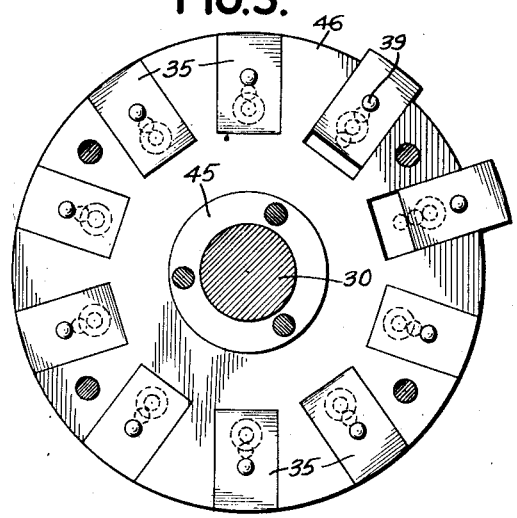
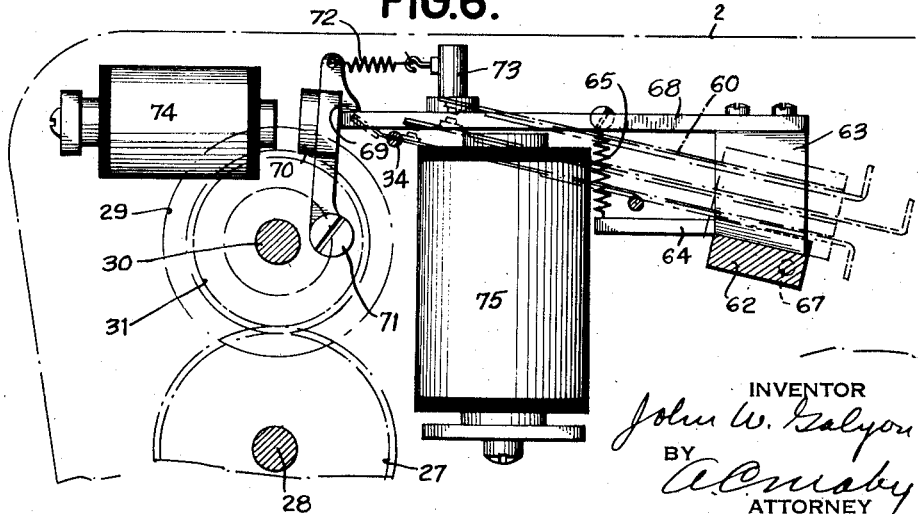
INVENTOR
John W. Galyon
BY
ATTORNEY Patented Nov. 29, 1938

2,138,630

UNITED STATES PATENT OFFICE 2,138,630

TABULATING MACHINE

John W. Galyon, Springfield, Ill., assignor to International Business Machines Corporation, New York, N. Y., a corporation of New York Application December 27, 1933, Serial No. 704,069

9 Claims. (Cl. 235—61.7)

The present invention relates to improvements in tabulating machines, and more particularly refers to machines of the type disclosed in Letters Patent of the U. S. No. 1,762,145 issued June 10, 1930 to George F. Daly, et al.

Machines of the type disclosed in this patent are well known in the art and are adapted to analyze record cards having control points or perforations thereon. Such machines, after analyzing the control points, may print all or a part of the data on a suitable record material or they may print data from each card and the total of such data for each group by cards. They may accumulate the data from successive cards, printing the total accumulated from all of the cards, or from a particular group of cards. These machines are quite flexible and other similar combinations may be effected.

In the machines disclosed in the above mentioned patent, the group numbers as taken from the card directly control the printing mechanism of the machine to print the group number from the first card of each group. After the first card of a group has been analyzed and the group numbers thereof printed, the machine proceeds successively to analyze the remainder of the cards in that group and upon a change of group designating numbers the tabulating machine automatically is brought to a stop and a total taking and resetting operation is initiated to print the total standing on the accumulator which total is the total data accumulated from the group, and to reset the totalizers or accumulators to zero.

Another combination that may be effected in the machines disclosed in the above named patent, is to control the total taking operation so as to operate at the end of each card, instead of controlling this operation upon a change of group designating numbers. They may print or list all the data of the card on a suitable record, and at the end of the listing operation, a total taking and resetting operation may be initiated to print the amount standing on the accumulator, which amount is the data entered from a single card, and then to reset the totalizers to zero.

One object of the present invention is the provision for printing the group number from the first card of each group while suppressing the printing of the total data accumulated from said group unless the total of said data has reached any predetermined amount within said group.

Another object is the provision for printing the group number from the first card of each group and printing the total data accumulated from said group in a particular manner when the total data accumulated from said group has not reached any predetermined amount within said group.

Another object of the instant invention is the provision for printing the group number from the first card of each group and printing the total data accumulated from said group, in a different manner, when the total data accumulated from said group has reached any predetermined amount within said group.

Another object of the instant invention is in addition to printing the group number from the cards to suppress the listing of the item indicated on the card unless the amount of said item equals or exceeds any predetermined amount.

Another object of the instant invention is in addition to printing the group number from the cards, to print the item indicated on the card in a particular manner when the amount of the item indicated on the card is less than any predetermined amount.

Another object of the instant invention is in addition to printing the group number from the card, to print the item indicated on the card in a different manner when the amount of the item on the card equals or exceeds any predetermined amount.

Various other objects and advantages of the invention will be obvious from the following particular description of two forms of mechanism embodying the invention or from an inspection of the accompanying drawings; and the invention also constitutes certain new and novel features of construction and combination of parts hereinafter set forth and claimed.

In the drawings:

Fig. 2 is an isometric view of one denominational order of an adding accumulator.

Fig. 3 is a fragmentary view of the total printing control device showing the selector and its relation to the contact assembly therewith.

Fig. 4 is a detail sectional view of the selector taken substantially on line 4—4 of Fig. 3.

Fig. 5 is a sectional view of the selector taken substantially on the line 5—5 of Fig. 4.

Fig. 6 is a fragmentary view of the total printing control device showing the magnet assembly and its relation to the contact assembly therewith.

Fig. 7 is a side elevational view of the ribbon control mechanism.

In order to understand the significance of the instant invention as applied to a machine of the type disclosed in the above mentioned patent, it should be borne in mind that such machines are adapted to be controlled to make listing operation and tabulating operation. The machine is controlled for listing operation to print the individual items with the group numbers or without group numbers and then prints the totals of the items without printing the group numbers (if included in listing). When controlled for tabulating operations, the group numbers and totals only are printed.

In certain organizations it is not desired to print the totals of each group unless the total is equal to or greater than a predetermined amount; or it may be desired to print the total of each group in a certain color when the total is less than a predetermined amount and print the total of each group when the total is equal to or greater than a predetermined amount, in another color. In the first case the group number is printed when the first card of each group is tabulated, but the total for the group is not printed unless it equals or exceeds the predetermined amount.

Then a record is made whereby the territory for each salesman and the amount of the corresponding quarterly quota are printed and the corresponding total number of sales and the total amount thereof whenever the total amount of each salesman is equal to or greater than the correspondingly assigned quarterly quota. A record then is made whereby the territory for each salesman and the amount of the corresponding annual quota are printed and the corresponding total number of sales and the total amount thereof whenever the total amount of each salesman is equal to or greater than the correspondingly assigned annual quota.

It is to be understood that in the above illustrative example, if desired, instead of suppressing the total printing of both total sales number and total amount thereof when the total amount is less than the corresponding monthly, quarterly or annual quota, by using another form of this device the total number of sales and the total amount thereof when less than the corresponding quota would be printed in a desired color and the total number of sales and total amount thereof when the total amount is equal to or exceeds the corresponding quota would be printed in a different desired color.

Figure 1:
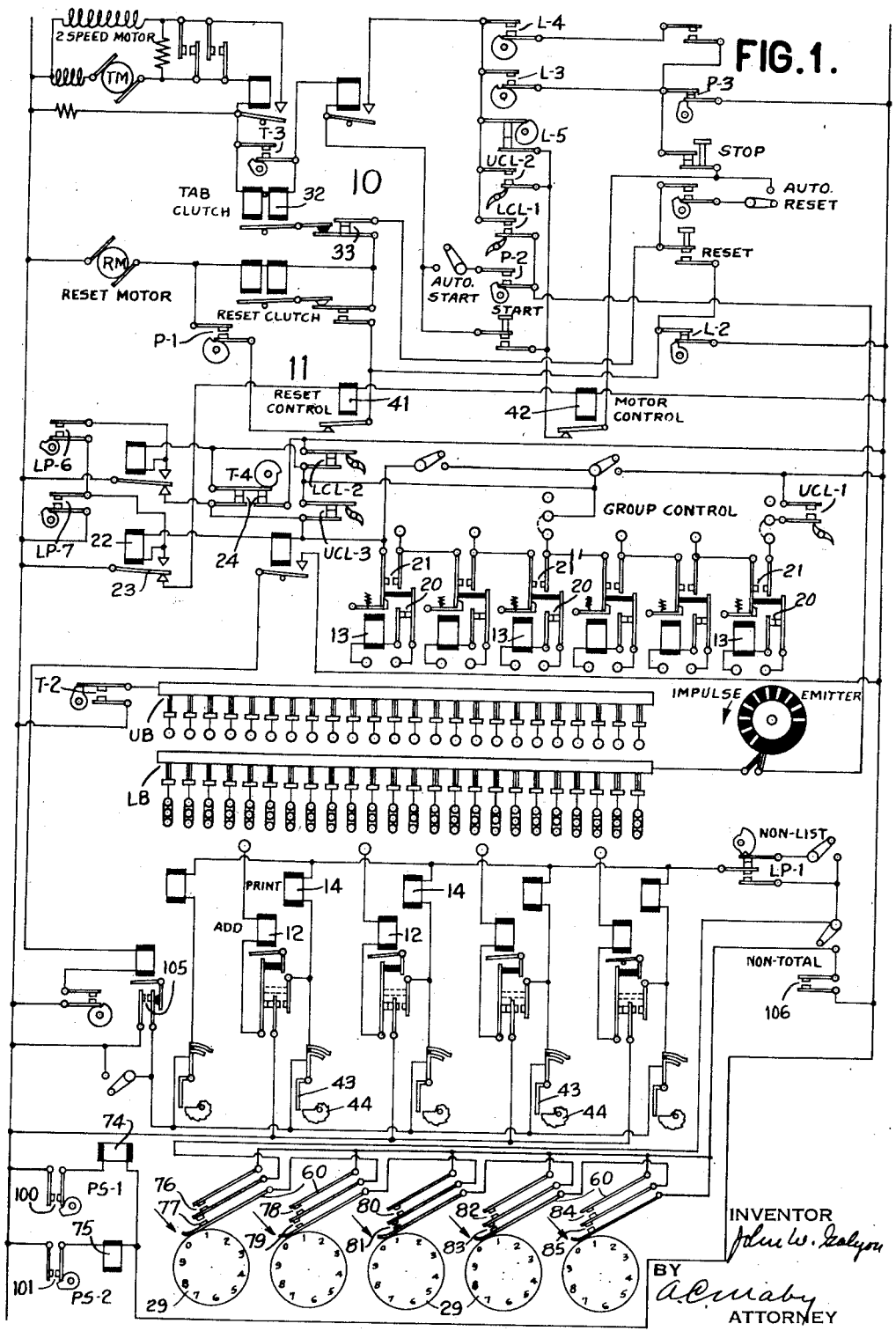
Fig. 1 is a conventional illustration of the circuit diagram including the total printing suppressing control device.

The circuit diagram (Fig. 1) is substantially the same as that shown in the above mentioned Daly patent. During tabulating operations the machine is driven by a tabulating motor TM (Fig. 1) under the control of the usual cam controlled and relay controlled circuits indicated generally at 10. During reset operations the machine is driven by a reset motor RM under the control of a group of contacts and relays indicated generally at 11.

At the end of each group the machine is automatically controlled to make a total printing operation or cycle and resetting cycle as disclosed in the above mentioned patent. In the latter case the group number is printed when the first card of each group is tabulated, and the total for the group is printed in a certain color when the total is less than the predetermined amount and the total for each group is printed in another color when the total is equal to or greater than the predetermined amount. At the end of each group the machine is then automatically controlled to make this total printing cycle and resetting cycle in the same manner as set forth in the above mentioned patent.

As an example for illustrative purposes let it be assumed, that a machine embodying the present invention is to be used in a general sales office wherein records are made of each salesman including, the district or territory assigned to each salesman, the monthly, quarterly and annual quota of each salesman, the number of sales and the amount of each thereof.

In this case the office does not wish to record the number of sales and the amounts thereof, unless the total amount of each salesman is equal to or greater than the assigned monthly, quarterly or annual quota. However it is desired to record the district or territory assigned to each salesman and the corresponding monthly quota. By using this device on a tabulating machine, characters designating the territory for each salesman and the amount of the corresponding monthly quota are printed, but the total number of sales and the total amount thereof are not printed unless the total amount is equal to or greater than the monthly quota.

When the machine is operated by the tabulating machine motor TM, the usual tabulating cards bearing differentially arranged index points or perforations, are fed past sets of upper analyzing brushes UB and then, exactly one card cycle later the cards are fed past lower analyzing brushes LB.

As the perforated cards are fed past the lower brushes the perforations thereon permit instantaneous closing of circuits to energize accumulator magnets 12. The timed energization of these magnets control mechanism well known in the art, to enter data interpreted from the card onto the accumulator wheels.

The accumulator is of the type disclosed in U. S. Patent No. 1,379,268 issued to C. D. Lake, May 24, 1921, and which includes gears 15 (Fig. 2), rotatably mounted on a reset shaft 16 suitably supported in the machine. These gears mesh with and are driven under the control of the magnets 12 by gears 17 mounted on a shaft 18. An indicator wheel 19, having indicia engraved, or otherwise suitably marked thereon, is secured to each of the accumulator gears 15 to enable the operator to read the data standing on the accumulator, directly therefrom.

It is well known in the art that machines of this type may be organized to automatically stop the listing or tabulating operation and to start a total printing operation when the control perforations on two successive cards do not agree. The means for initiating such an automatic group control involves a group control circuit such as is disclosed in the patent to F. M. Carroll et al., No. 2,066,305, issued December 29, 1936 in which the circuit, described briefly includes magnets 13 and contacts 20 (Fig. 1) adapted to be plugged between the upper and lower brushes.

The purpose of the contacts 20 is to open after the magnets 13 are energized in order to take the arc from the brushes. Energization of the magnets 13 closes corresponding contacts 21, thus establishing the so-called group control circuit which extends serially through all contacts 21. This circuit is established in each card cycle so long as the control perforations on each two successive cards agree. So long as this control circuit is made the machine will continue uninterruptedly to tabulate the cards passing through the machine. However, if one or more group control perforations do not agree on two successive cards, the corresponding magnets 13 are not energized and their contacts 21 are not permitted to close. Thus the group control circuit is open and at the end of the card cycle, the machine is controlled to initiate a total printing operation, during which operation the amount standing on the totalizer wheels is set up in the printer mechanism and printed. The totalizer or accumulator is then reset to zero.

The printing mechanism is substantially the same as that fully disclosed in Daly Patent No. 1,762,145 and the following is a brief description whereby a total printing and resetting operation is initiated automatically.

When one or more group control numbers or perforations on two successive cards do not agree and the corresponding contacts 21 remain open, as above set forth, a magnet 22, (Fig. 1), becomes deenergized upon opening of test contacts 24 near the end of a tabulating operation. The magnet 22 is normally energized on tabulating operations, holding its armature 23 against the upper contact to maintain magnets 41 and 42 deenergized. So long as the magnet 42 is deenergized an operating circuit is maintained through the tabulating motor.

However, when a group change occurs and the magnet 22 is deenergized, its armature 23 drops into contact with the lower contact energizing the magnets 41 and 42. The magnet 42, when energized, attracts its armature thus opening the circuit through the tabulating motor TM. This deenergizes clutch magnet 32 permitting contacts 33 to close establishing a circuit through the reset motor RM, whereupon, at the end of the current tabulating operation, the machine proceeds into a resetting and total printing operation.

In order to read off the total standing on the accumulator, as is well known in the art, a number of feeler fingers 43 (Fig. 1), are adapted to cooperate with the stepped cams 44 which are attached to gears 25 (Fig. 2) and mesh with gears 17 which in turn mesh with the totalizer gears 15. The gears 25 and cams 44 are set to positions corresponding to the setting of the totalizer gears.

As fully disclosed in the Daly Patent No. 1,762,145, the fingers 43 come in contact with and are arrested by the stepped cams 44 and by means of a series of contacts close a circuit through the printer magnets 14 (Fig. 1) for that denominational order, thereby causing the printing mechanism to set up the particular type corresponding to the setting of the totalizer gear and then to print the corresponding data. After the total standing on the totalizer is printed the totalizer then resets to zero in the usual well known manner.

Since it is an object of this invention to suppress total printing unless the total amount of each group equals or exceeds the predetermined amount set up on the selector wheels 29, means is provided to prevent energization of the printer magnets 14 until the total amount of each group is equal to or exceeds the predetermined amount. This means includes magnets 74 and 75 (Fig. 1) which are normally deenergized during the tabulating operation and which are adapted to be energized at the beginning of each total printing operation. These magnets are so provided, that the energization of magnet 75 occurs at an interval before the energization of magnet 74, by the contacts 101 and 100 respectively. Both magnets are deenergized just before the beginning of the resetting cycle.

Referring to Fig. 6, magnets 74 and 75 are suitably supported to the frame of machine 2. Armature 70 of magnet 74, at one end is pivoted at 71, and at its free end is provided with a spring 72 secured to post 73 supported on armature 68. Armature 70 is provided with a finger member 69 which, when armature 68 is attracted to its magnet 75, is permitted to rotate clockwise under influence of its spring, to lock armature 68 in that position. Upon the energization of magnet 74, its armature 70 is attracted, which in turn permits the release of armature 68.

Attached to armature 68 is an arm 63 to which is secured an extension bar 62 suitably supported by frame 2 and pivoted at 67. A series of contact assemblies 60, one contact assembly for each corresponding selector wheel 29, are suitably secured to extension bar 62 and insulated therefrom. The contact assemblies are so arranged that when magnet 75 is energized attracting its armature 68, then locked in position by armature 70 as set forth above, they are rotated about pivot 67 counterclockwise, to enable insulated tips of lower contacts 61 (Fig. 3) to engage selector wheels 29. This counterclockwise rotation is limited by stop 34 to prevent too forcibly an engagement of contact assemblies and selector wheels. Upon the energization of magnet 74 and deenergization of magnet 75, the attraction of armature 70 releases armature 68, which in turn disengages contact assemblies 60 and selector wheels 29, under the influence of spring 65 urging bar 62 through its attached arm 64.

In Figs. 2 and 4 selector wheels 29 are rotatably mounted on sleeves 45 which in turn are rotatably mounted on shaft 30 suitably supported in machine. The selector wheels are attached to gears 31 which mesh with intermediate gears 27, rotatably mounted on shaft 28 suitably supported in machine, which in turn mesh with gears 25. Gears 25 with attached cams 44 and gears 31 with attached selector wheels 29 are set in a position commensurate to the setting of the corresponding accumulator gears 15.

The selector wheels (Figs. 3, 4 and 5) consist of an annular block 46 shaped so as to receive removable inserts 35 having protruding pins 39 and hollowed out to receive balls 37 which are forced by springs 38 against notches 47 in plate 49. Notches or grooves 47 are arranged so that inserts 35 can be maintained in various separate positions by virtue of balls 37 forced in these notches.

Circular plates 49 and 48 are suitably attached to annular block 46. Slots 40 in plate 48 are arranged to allow protruding pins 39 to move the inserts to various positions. Pawl lever 50 attached to plate 48 is pivoted at 51, its pawl 52 held by spring 55 in notch 53 on cam plate 54. Gear 31 and cam plate 54 are fastened to tubular sleeve 45, and as mentioned before sleeve 45 is rotatably mounted on shaft 30. During operation of machine, pawl 52 is set in notch 53, so that rotation of gear 31 revolves selector wheel. When it is desired to change the set up of the amount on the selector wheels, the selector wheels can be rotated independently of gear 31 and sleeve 45, so that the movable inserts to be reset are made more accessible.

The method whereby contact assemblies 60 control the suppressing of total printing during each group will now be explained: Referring to Figs. 1, 1B, 1C, 1D, 1E, the selector wheels show the device set up for the number 25743. The inserts 35 as indicated by these numbers are moved to the middle or intermediate position, for example, on the A selector wheel of the device the number 2 insert is set to the intermediate position. For the figures less than 2 the corresponding inserts are set in the flush position and all the corresponding inserts for figures above 2 are set to the outermost position, selector wheels B—C—D and E are set up in a similar manner for their corresponding figures, namely, 5, 7, 4 and 3.

The contact assemblies are shown to be in the position occupied during the total printing operation, during which magnet 75 is energized and its attracted armature locked in position by armature 70, magnet 74 being deenergized. When the armature 68 is in a locked position the magnet 75 is deenergized. Magnet 74 is energized at the end of the total printing operation to release the locked armature 68 and upon the release of this armature is deenergized.

The contact assemblies are connected in series with the printing magnet circuit, so it is obvious that if any one contact assembly does not close this circuit during the total printing operation, total printing will be suppressed. As will now be explained, if the amount registered on the selector wheels of this device corresponding to the amount accumulated on the totalizer wheels for each group is less than the predetermined amount for each group set up in the selector wheels by placing the movable inserts to a position corresponding to the predetermined amount for each group, the printing magnet circuit will remain open during the total printing cycle when the contact assemblies are placed in engagement with selector wheels.

The printer magnet circuit will be closed, and total printing allowed at the end of each group change when the contact assemblies are placed in engagement with selector wheels during the total printing cycle, only when the amount registered on the selector wheels for each group, corresponding to the amount registered on accumulator wheels is equal to or exceeds the predetermined amount which was set up in the selector wheels for each group by placing the movable inserts to a position corresponding to the predetermined amount for each group.

Figure 1A:
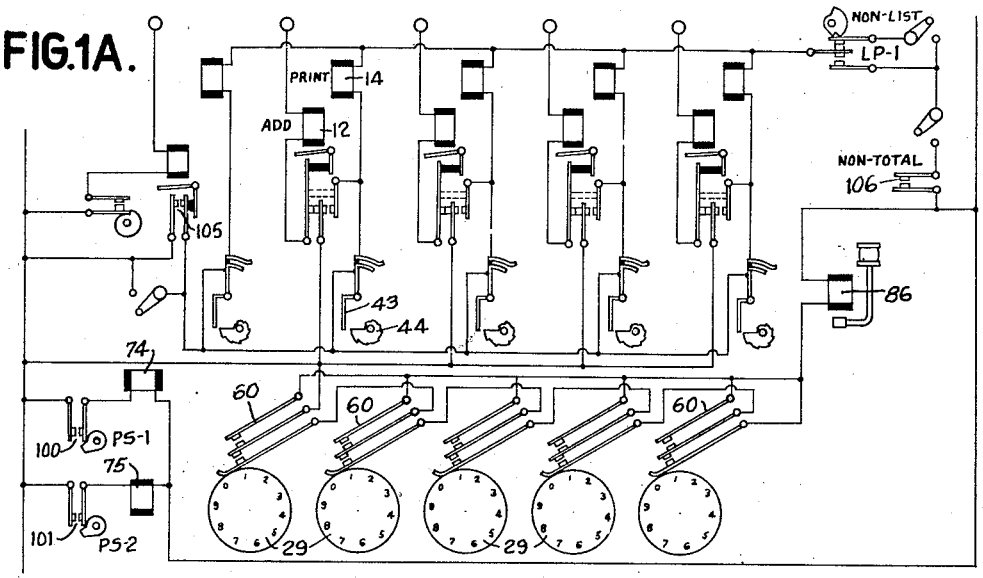
Fig. 1A is a partial illustration of the circuit diagram including the total printing ribbon control device.
Figure 1B:
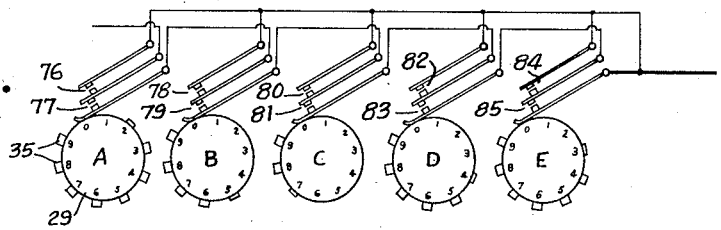
Figs. 1B, 1C, 1D, 1E are partial diagrammatic illustrations of the total printing control device.
Figure 1C:
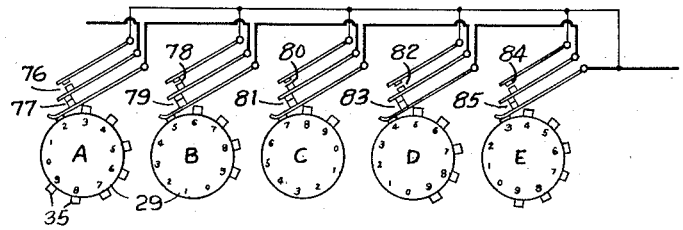

Fig. 1C shows the total number registered on the selector wheels, 25743, which equals the predetermined amount set up in the selector wheels, and the contact assemblies placed in engagement with selector wheels. The inserts representing the digits of the predetermined number, in their intermediate position are in direct engagement with the contact assemblies. Due to the intermediate position of the inserts, the lower contacts of the contact assemblies are closed. Therefore the circuit established, as indicated by the heavier line, is as follows: through closed contact 77 of selector A, through closed contact 79 of selector B, through closed contact 81 of selector C, through closed contact 83 of selector D, and through closed contact 85 of selector E. It is seen that the printer magnet circuit is established so as to permit total printing upon energization of the printing magnets 14 which is as follows, from left side of the line through now closed contacts 105, printing mechanism contacts shown generally as 43, printer magnets 14, lower contact LP—1 now closed, contact assemblies as just set forth, now closed contacts 106 to right side of line.

The closure of contacts 105 is controlled by the magnet 22. It is described in the said Carroll reference how the said magnet is deenergized upon a major control change for a machine cycle, due to the timing of the cam controlled contacts, and is energized during the second cycle to permit total printing to be effected. In the event that the machine is conditioned for minor control changes only, the contacts 105 are manually set so as to be closed at all times thus establishing a total printing circuit when the contact switches 60 are properly conditioned by the selectors 29.

Total printing will be permitted for each successive card group if the total accumulated for each group equals the predetermined value set up in the selector wheels, in this example 25743. Total printing will be permitted if the total accumulated for each group exceeds the predetermined value set up in the selectors, as follows: In Fig. 1E, the predetermined value set up in the selectors is the same amount, 25743, the amount registered on the selectors is 26643.

The insert for digit 2 in selector A, set in its intermediate position, in engagement with its contact assembly, closes contacts 77; insert for digit 6 in selector B set in its outermost position, in engagement with its contact assembly, closes contacts 78 and 79; insert for digit 6 in selector C, set in its flush position, in engagement with its contact assembly, does not affect contacts 80 nor 81; insert for digit 4 in selector D, set in its intermediate position, closes contacts 83; and insert for digit 3 in selector E, set in its intermediate position, closes contacts 85. Following the heavy line, the circuit established through the contact assemblies is through contacts 77 and contacts 78, in this manner the printer magnet circuit is closed permitting a total printing to be made.

Figure 1D:
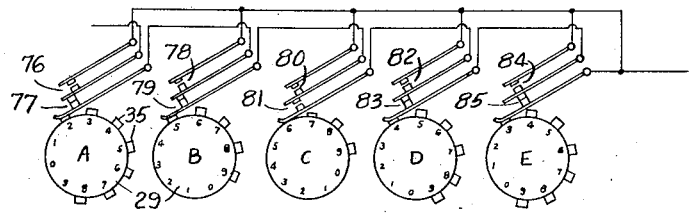
Figure 1E:
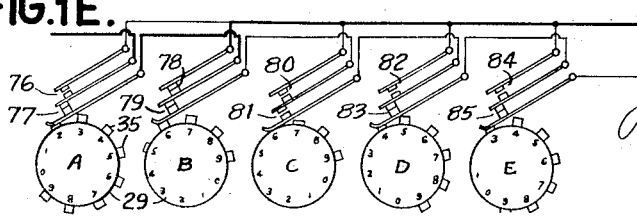

Referring to Fig. 1D, the amount registered on the selectors is 25643 which is less than the predetermined value set up in the selectors, the contacts 80 and 81 remain open during the total printing cycle and in this manner suppresses total printing.

A modification of the circuit diagram will now be explained whereby, instead of suppressing the total printing, the totals are printed in a different manner, for example, for amounts less than the predetermined amount set up in the selectors, the totals are printed in one color, and for amounts that equal or exceed the predetermined set up in said selectors, the totals are printed in another color.

Referring to Fig. 1A, the contact assemblies 60 instead of being connected in series with the printer magnet circuit as in the first case, are connected to the source of supply with magnet 86 connected in series therein. Total printing will take place at the end of each card group change, as is well known and explained previously.

The color of printing is controlled by magnet 86 in conjunction with the contact assemblies and selectors.

The ribbon control mechanism (Fig. 7) is suitably supported on the printing mechanism of the machine, consisting of a ribbon guide spool 90 rotatably mounted on extension rod 88 secured to armature 87. Extension rod 88 is supported by guide posts 89 attached suitably to printer of machine and guide stop 92 to prevent the travel of extension rod 88 upon deenergization of magnet 86.

During tabulating operations and total printing operations where the total amount printed for each card group is less than the corresponding predetermined value set up in selectors, magnet 86 remains deenergized and total printing is printed in a color corresponding to color of part a of ribbon 91. When total amount to be printed for each group is equal to or exceeds its corresponding predetermined amount, contact assemblies 60 establish a closed circuit as previously explained permitting magnet 86 to be energized whereupon its attracted armature 87 shifts the extended arm 88 and ribbon guide spool 90 upwardly, so that the type bars strike section b of ribbon 91 so as to print the total amount in a color corresponding to the color of section b of the ribbon.

At the end of the total printing cycle magnet 74 is energized for a timed interval and magnet 75 is deenergized thereby disengaging the contact assembly from the associated selector wheels, in turn deenergizing magnet 86 and thus restoring the ribbon shifting mechanism to its former position.

While there has been shown and described and pointed out the fundamental novel features of the invention as applied to two modifications, it will be understood that various omissions and substitutions and changes in the form and details of the device illustrated and in its operation may be made by those skilled in the art without departing from the spirit of the invention. It is the intention therefore to be limited only as indicated by the following claims.

What is claimed is as follows:

1. In a device of the character described, the combination of record analyzing means, accumulating means for the record data analyzed, said accumulating means comprising a plurality of orders of indicating means and associated driving means therefor controlled by the said analyzing means, individual control means actuated by said driving means to be positioned in accordance with the said indicating means, a plurality of settable means included in each individual control means whereby a predetermined setting of any amount can be made, individual contact arrangements cooperating with each of said control means and adapted to be operated by the selected settable means thereof, and a circuit connecting the contacts in series operative when the total in the accumulating means equals or exceeds the predetermined amount set up within said control means.

2. In a device of the character described, the combination of record analyzing means, accumulating means for the record data analyzed and controlled by said analyzing means, settable means controlled by said accumulating means to be set to a position commensurate therewith, said settable means comprising individual members each including a plurality of elements adapted to be arranged in a number of different positions, said arrangement of the elements dependent upon the predetermined amount to be set up thereon, a plurality of contacts adapted to be controlled in accordance with the position of the said elements, and a circuit controlled by the said contacts so as to be energized when the total in the accumulating means equals or exceeds the predetermined amount set up on said settable means.

3. In a device of the character described, means to accumulate an amount, a settable device controlled by said accumulating means and set in a position commensurate therewith, said device comprising individual rotary members each including a plurality of movable elements adapted to be arranged in different positions, said arrangement of the elements being dependent upon the predetermined amount to be set up therein, the elements corresponding to the said predetermined amount being set in an intermediate position, and the elements corresponding to an amount exceeding the predetermined amount being set in a different position, a plurality of contacts adapted to be controlled in accordance with the position of the said elements, and a circuit controlled by the said contacts so as to be energized when the total in the accumulating means equals or exceeds the predetermined amount set up on said settable means.

4. In a machine of the class described, means for sensing data on a record, data accumulating means comprising a plurality of differentially positioned accumulating elements controlled by said sensing means, means positioned by the accumulating elements including manipulative means manually settable to represent any predetermined amount, control means rendered effective by the said manipulative means when the amount of the data in the accumulating means bears a predetermined relationship to the amount set up in said manipulative means, and means controlled by the said control means when it is rendered effective.

5. In a machine of the class described, means for sensing data on a record, data accumulating means comprising a plurality of differentially positioned accumulating elements controlled by said sensing means, manipulative means manually settable to represent any predetermined amount positioned by the accumulating elements, means including a control circuit and a plurality of circuit control means controlled by the manipulative means for conditioning the control circuit for control purposes when the amount in the accumulating means bears a predetermined relationship to the said predetermined amount, and means controlled by the control circuit upon conditioning thereof.

6. In a machine of the class described, means for sensing data on a record, data accumulating means comprising a plurality of differentially positioned accumulating elements controlled by said sensing means, means positioned by the accumulating elements comprising manipulative means manually settable to represent any predetermined amount, a series of circuit conditioning means rendered effective by the manipulative means whenever the amount in the accumulating means bears a predetermined relationship to the said predetermined amount, and a control circuit including control means controlled by the said conditioning means so as to be energized whenever the circuit conditioning means are rendered effective.

7. In a machine of the class described, means for sensing data on a record, data accumulating means comprising a plurality of differentially positioned accumulating elements controlled by said sensing means, a plurality of rotatable elements, each positioned by an accumulating element, each of said rotatable elements including manually settable means positionable to represent any predetermined digit, and a control circuit including means controlled by said settable means conditioned for energization when the amount in the accumulating means bears a predetermined relationship to the amount set up in said settable means.

8. In a machine of the class described, means for sensing data on a record, data accumulating means controlled by said sensing means comprising a plurality of differentially positioned accumulating elements, printing means for printing amounts set up in the accumulating means including normally ineffective control circuits therefor, a plurality of selectors positioned by the accumulating elements including manually settable means positionable to represent any predetermined amount, and means controlled by the said settable means to render effective the said control circuits to permit printing when the amount in the accumulating means equals or exceeds the said predetermined amount.

9. In a machine of the class described, means for sensing data on a record, data accumulating means controlled by said sensing means, comprising a plurality of differentially positioned accumulating elements, printing means for printing amounts controlled by the accumulating means, a plurality of selectors positioned by the accumulating elements including manually settable means positionable to represent any predetermined amount; a control circuit to control the operation of the printing means including control means conditioned by the selectors to render the control circuit effective to control the operation of the printing means when the amount in the accumulating means bears a predetermined relationship to the predetermined amount.

JOHN W. GALYON.